Dec. 18, 1928.  1,696,020
J. VAN BUREN
WRAPPING AND LABELING MACHINE
Filed Jan. 11, 1923   9 Sheets-Sheet 7

INVENTOR.
John Van Buren
BY E. W. Marshall
ATTORNEY.

Dec. 18, 1928.
J. VAN BUREN
1,696,020
WRAPPING AND LABELING MACHINE
Filed Jan. 11, 1923   9 Sheets-Sheet 8
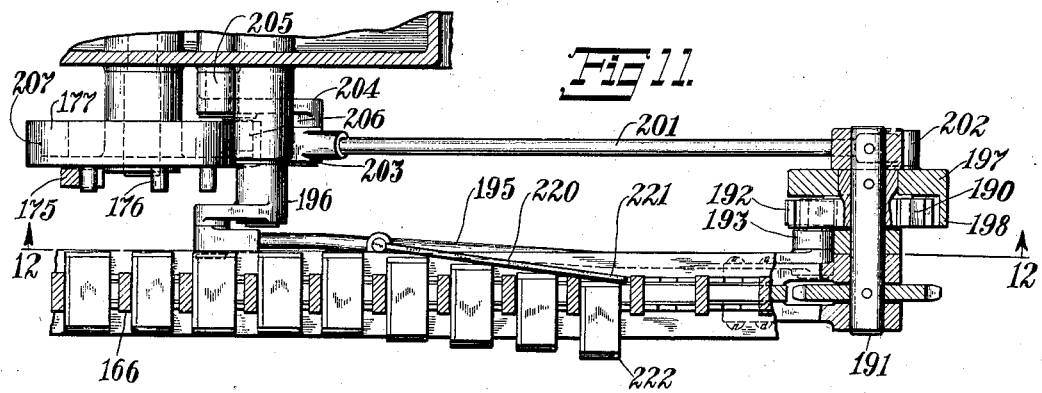
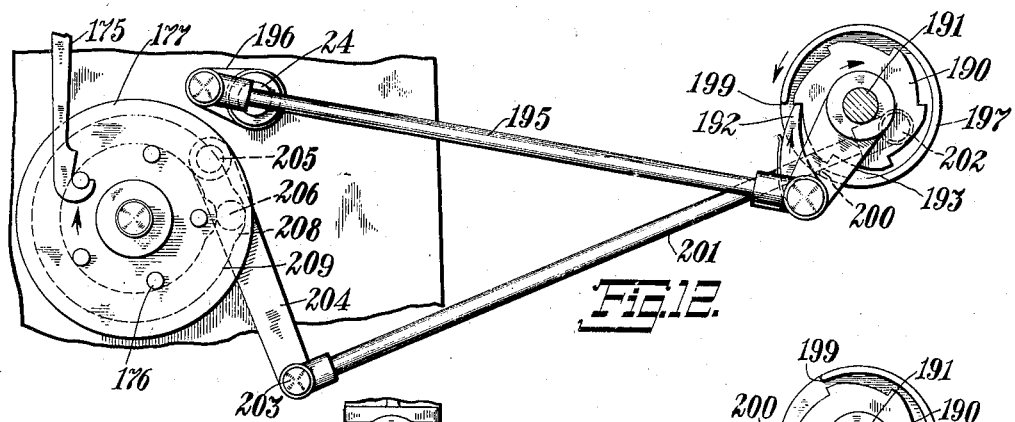
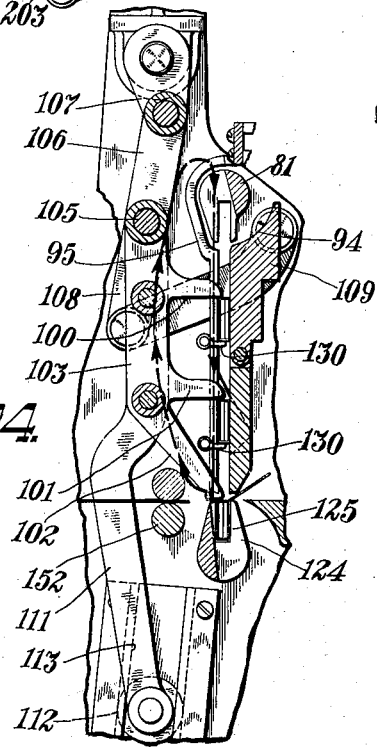
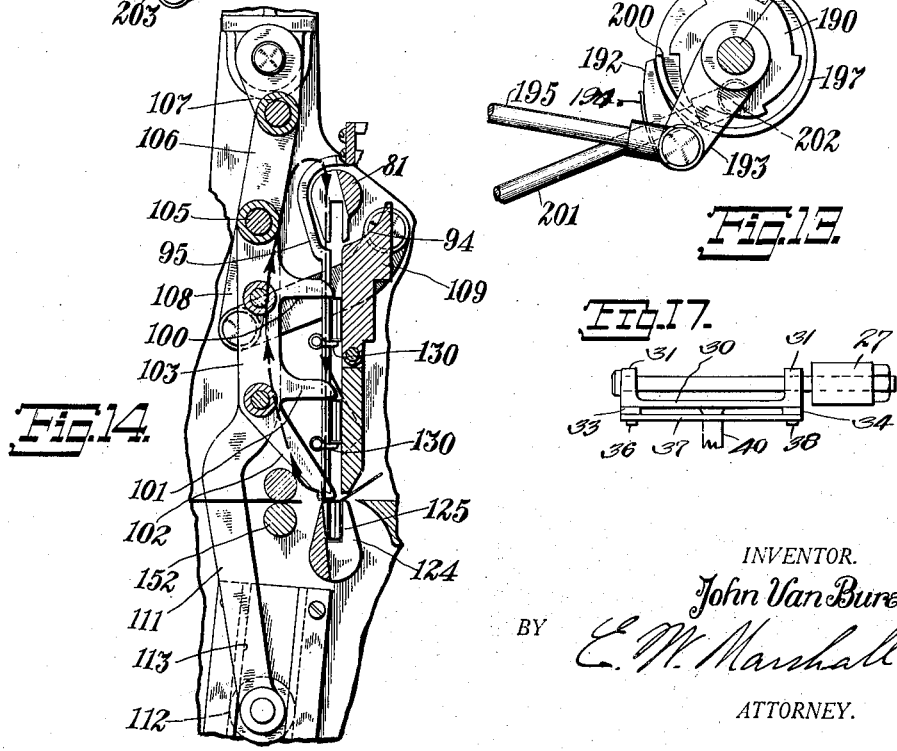
INVENTOR.
John Van Buren
BY
E. W. Marshall
ATTORNEY.

Dec. 18, 1928.

J. VAN BUREN 1,696,020

WRAPPING AND LABELING MACHINE

Filed Jan. 11, 1923

INVENTOR.
John Van Buren
BY
E. W. Marshall
ATTORNEY.

Patented Dec. 18, 1928.

1,696,020

UNITED STATES PATENT OFFICE.

JOHN VAN BUREN, OF BROOKLYN, NEW YORK.

WRAPPING AND LABELING MACHINE.

Application filed January 11, 1923. Serial No. 611,913.

This invention relates to wrapping and labeling machines.

The invention has been particularly worked out and the machine about to be described was particularly developed for wrapping sticks of gum but it should be understood that the machine is not limited to any such specific use but is capable of many applications.

One of the objects of the invention is to provide a machine of the character described that is simple and practical in construction and contains a minimum number of parts for carrying out the functions for which the machine was designed.

Another object of the invention is to provide in a wrapping and labeling machine simple, practical and efficient means for feeding and cutting a web of wrapping material.

Another object of the invention is to provide improved means for placing a wrapper around the material to be wrapped and for supporting and feeding the wrapped package.

Another object of the invention is to provide a practical and efficient mechanism for feeding the wrapped packages through the various parts of the apparatus in such a manner that the wrapping around the material is not loosened or disarranged.

Another object of the invention is to provide in a machine of the class described, means for effectively discharging the wrapped and labeled packages from the wrapping and labeling mechanism to a carrier.

Another object of the invention is to provide means for receiving and stacking the finished packages and for feeding the packages in lots of a predetermined size or number.

Further objects of the invention and other more specific details will be clear from the following specification taken in connection with the drawings which form a part of this application and in which, Fig. 1 is a top plan view of a wrapping and labeling machine constructed in accordance with the invention.

Fig. 2 is a sectional elevation of the machine shown in Fig. 1 taken substantially on line 2—2 of Fig. 1.

Figs. 3, 4 and 5 are sectional elevations of the machine taken substantially on lines 3—3, 4—4 and 5—5 of Fig. 2.

Figure 6:
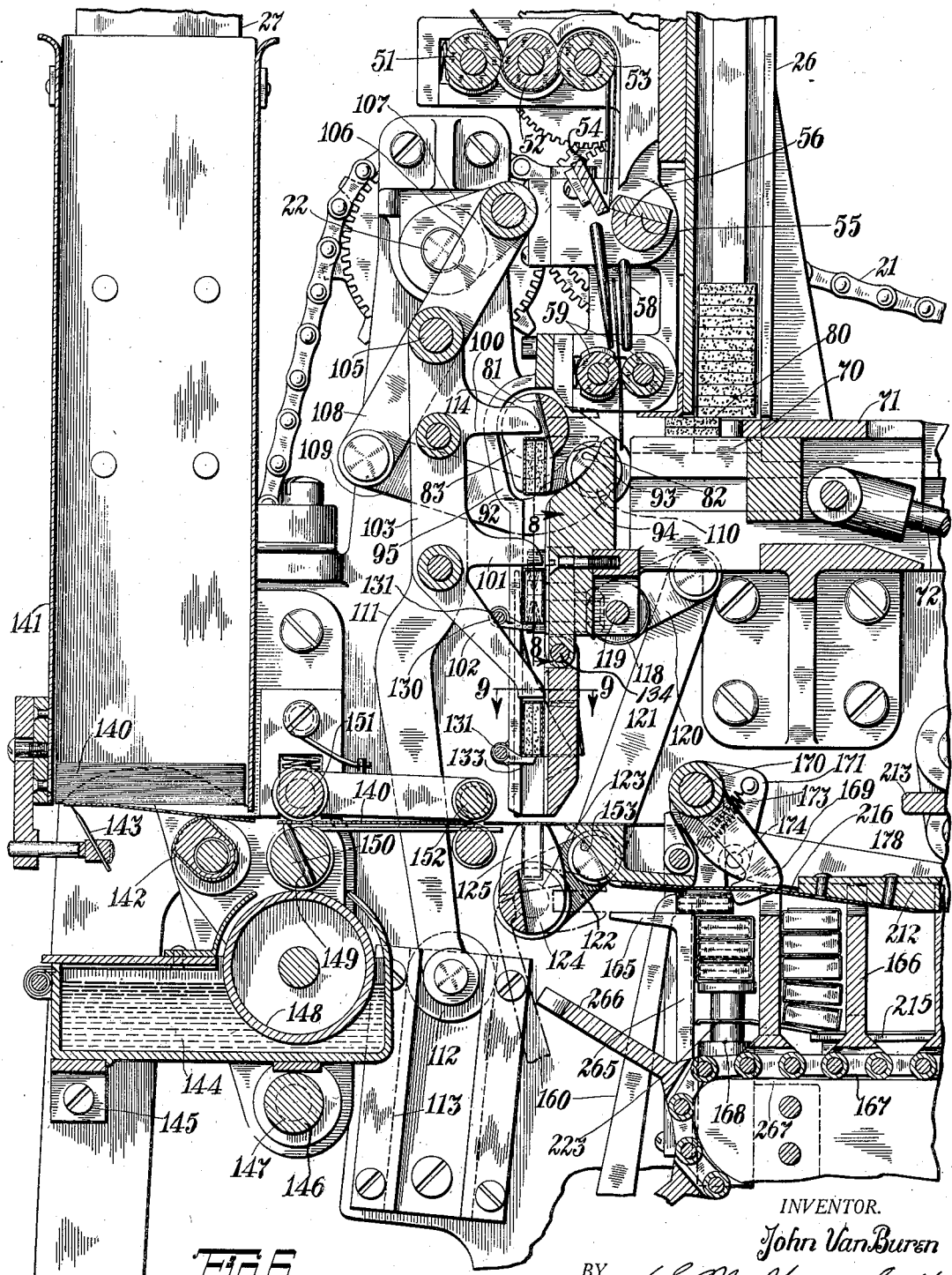
Fig. 6 is an enlarged sectional detail elevation showing particularly the means for feeding the packages through the various sets of operating mechanisms.
Figure 8:
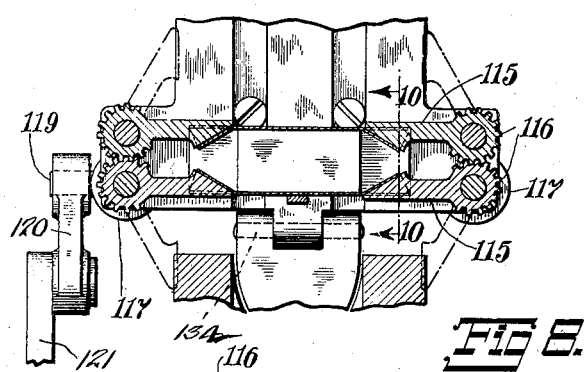
Figure 9:
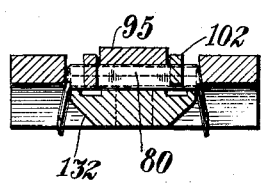

Figs. 8 and 9 are enlarged sectional elevations taken respectively on lines 8—8, and 9—9 of Fig. 6.

Figure 10:
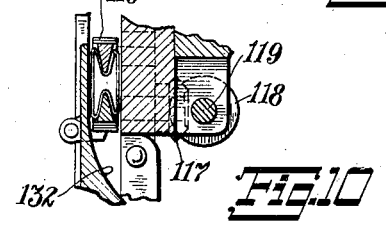

Fig. 10 is a sectional elevation taken substantially on line 10—10 of Fig. 8.

Fig. 11 is a sectional elevation showing the feed control for the endless carrier or delivery chain.

Fig. 12 is an elevational view showing the carrier feed mechanism.

Fig. 13 is a detail elevation of a portion of the carrier feed mechanism.

Fig. 14 is a detail sectional view showing the package feeding mechanism.

Figure 15:
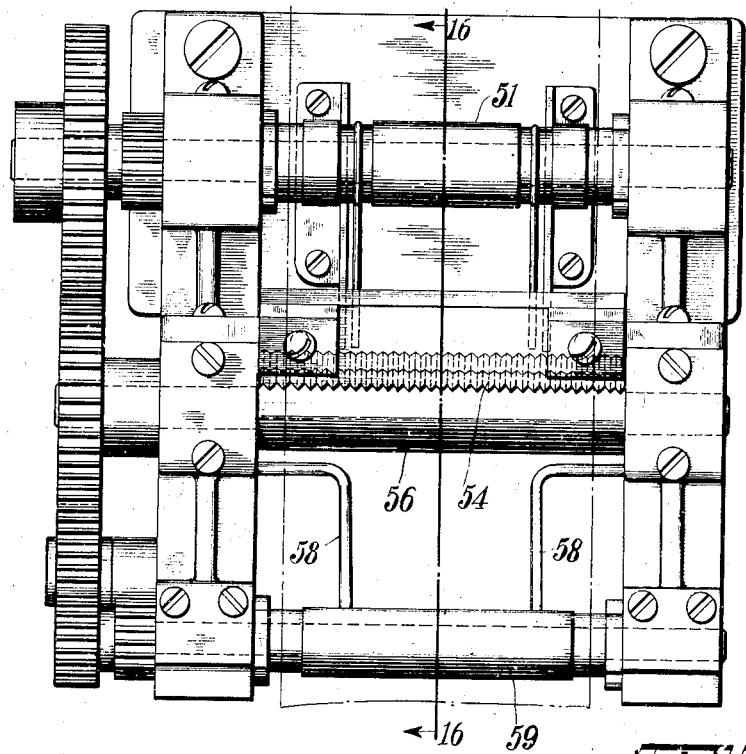
Figure 16:
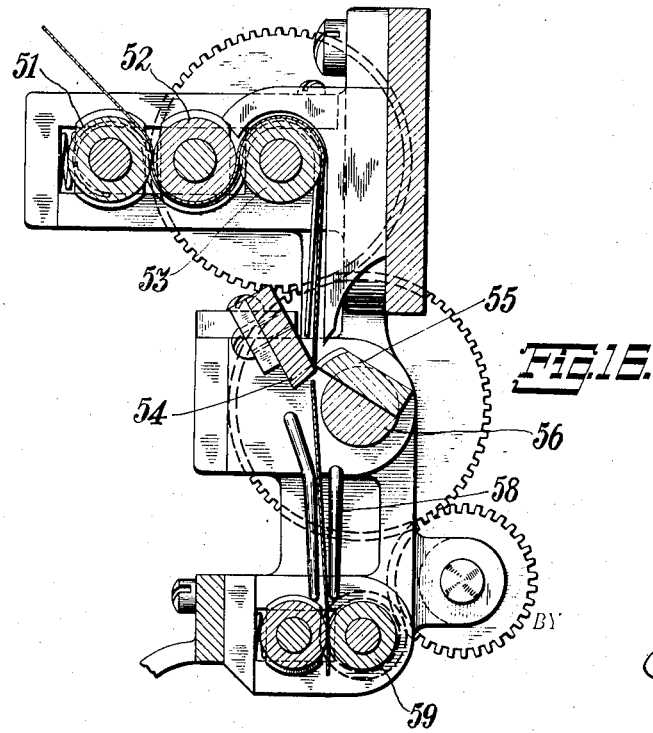

Fig. 15 is an elevation and Fig. 16 is a vertical sectional view of the cutting mechanism for the strip of wrapping material.

Figure 2:
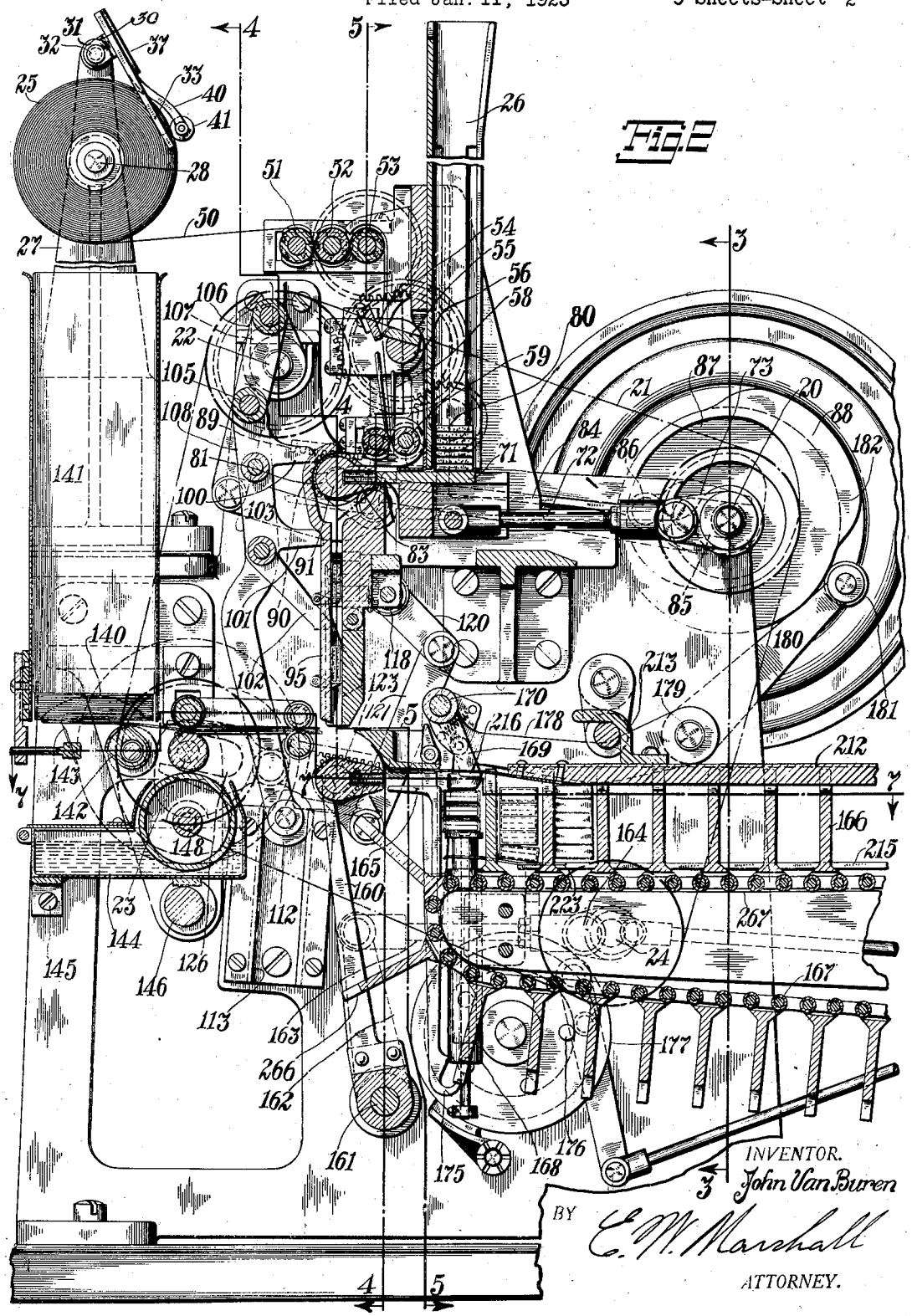
Figure 4:
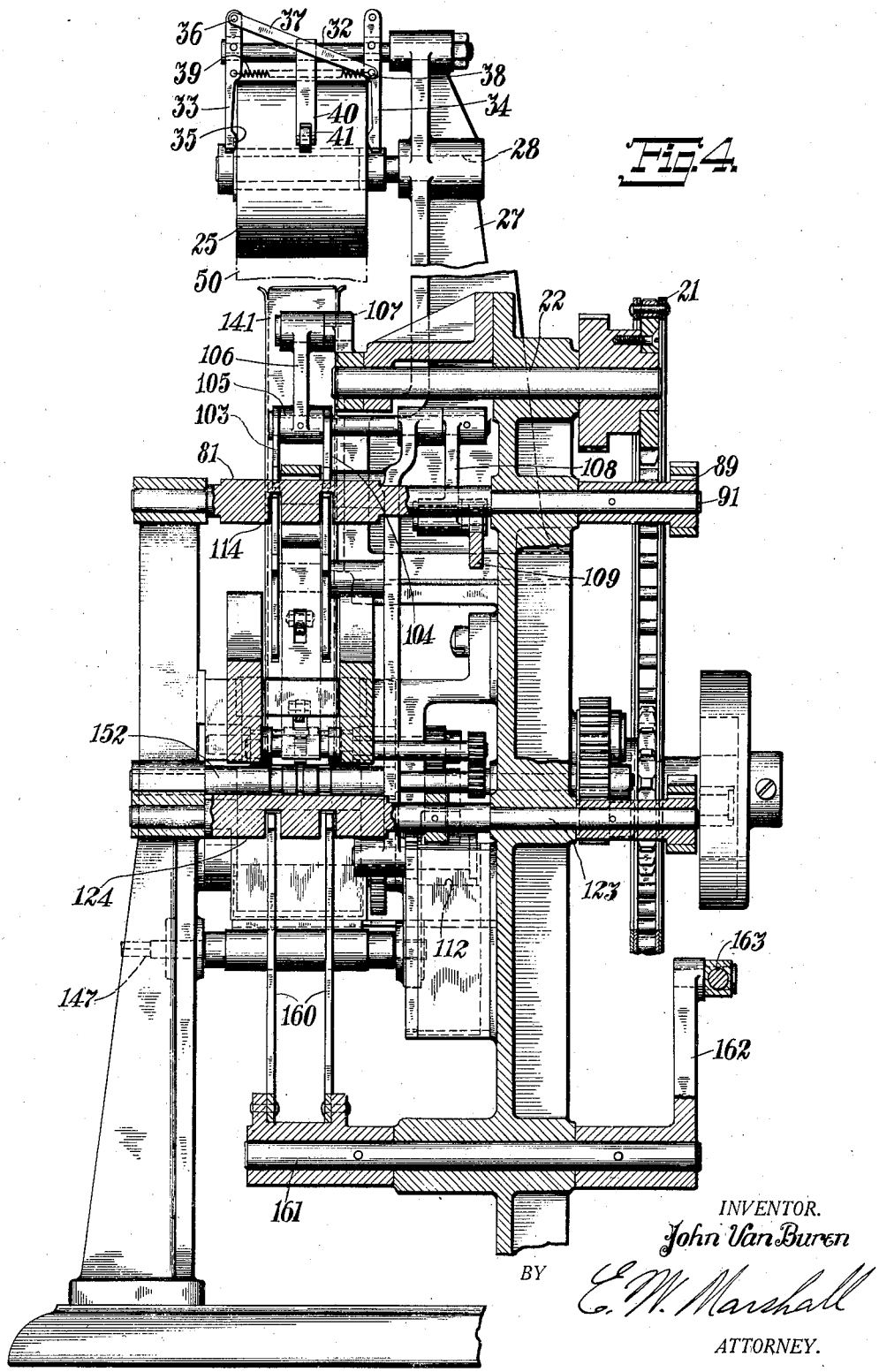

Fig. 17 is a plan view of the centering device shown in Figs. 2 and 4.

The invention or the machine embodying the invention comprises a plurality of mechanisms for accomplishing the wrapping and labeling of the material operated upon. These mechanisms are all driven from a common drive through suitable transmission mechanism such as chain and sprocket and gearing. The wrapping material is drawn from a supply roll and is positively fed and cut into strips of suitable length. The cutting or severing mechanism also acts to feed the strip forward and other feeding means operating at a higher rate of speed pulls the severed strip or advances it rapidly from the cutting rolls. This strip is then fed into the path of movement of the strips of gum or other material and these pieces are forced into the strip thereby causing the cut strip or wrapper to be wrapped around three sides of the material. The material thus wrapped is rotated through an angle and is then fed vertically to tucking mechanism and folding means. From this mechanism the wrapped package is fed into engagement with a label which is wrapped around the package in a manner similar to the first wrapping of the material. The labeled package is then positively fed to an endless carrier and the packages are stacked in the carrier, the latter being automatically advanced upon the completion of each stack, which in the form of the invention shown consists of five packages. Further details of the invention will now be described.

Any suitable driving connections for the machine may be provided and in the form of the invention illustrated the various parts of the machine are all actuated from a common drive shaft 20. This shaft is connected by a chain 21 to shafts 22, 23 and 24 and from these shafts the various driving connections for the operative parts of the machine receive their power.

In the form of the invention illustrated the packages are fed downwardly and substantially vertically. The wrapping material such as wax paper or tinfoil is fed from a supply roll 25 and the sticks of gum or other material are carried by a hopper 26.

*Wrapper feeding and cutting mechanism.*

The roll of wrapping material 25 is mounted in a bracket 27 and means is provided for centering this roll on the shaft 28 in order to properly position the roll with reference to the strip feeding mechanism. The centering device comprises a member 30 having spaced lugs 31 mounted on a rod 32 secured to the upper end of the bracket 27. At one end of the member 30 is pivoted an arm 33 and at the opposite end is pivoted an arm 34, these arms having their end portions 35 positioned to engage the sides of the supply roll 25. The arm 33 is extended beyond the pivot and its extended end is connected at 36 by a link 37 to the arm 34, the connection to the arm 34 being indicated at 38. The arms 33 and 34 are also connected by a spring 39. Adjacent its central portion there is also secured to the member 30 a rod or bar 40 having a roller 41 at its free end. The roller 41 is adapted to engage the outer surface of the roll 25 of wrapping material. Since the member 30 is mounted on the rod 32 and is held against endwise movement thereon it will be evident that the pressure of the spring 39 will center the roll 25 on the spindle 28 upon which it is mounted. This centering will be effected regardless of the width of the roll 25 by reason of the resilient connection between the arms 33 and 34. It will be understood that any other form of centering means may be used if desired in connection with the supply roll 25.

From the roll 25 the web or strip 50 of wrapping material is fed through rolls 51, 52 and 53 and passes over the rolls 51 and 53, and under the roll 52. These rolls are positively driven by means of spur gears from the shaft 22, the gearing connections being clearly illustrated but it is not deemed necessary to describe such connections in detail.

From the roll 53 the web 50 passes downwardly between cutting mechanism comprising a fixed blade 54 and a rotary knife 55 mounted in a rotary knife carrier 56, driven from the shaft 22. The blade 54 has a serrated cutting edge and the knife 55 has an arcuate, serrated edge adapted to coact with the edge of the blade as the knife carrier and knife 55 are rotated.

Below the cutting mechanism are mounted guiding members 58 between which the severed strip is guided to feed rolls 59. These latter rolls are preferably driven at a higher rate of speed than the knife carrier or the rolls 51, 52 and 53 and because of this the strip is accelerated or rapidly drawn away from the cutting mechanism. The accelerated rate of speed of rolls 59 also keeps the web material taut as it is being fed and before it is severed thereby facilitating the action of the knife 55.

*Gum feeding and wrapping mechanism.*

The hopper 26 has formed on one side thereof lugs 60 and a pin 61 is passed through apertures in these lugs and through apertures in corresponding lugs 62 formed on the machine frame. A spring 63 surrounds the pin 61 and engages lugs 62 and 60 thereby retaining the hopper in its lower position. At the opposite side of the hopper I have provided a latch 64 actuated by a spring 65 and having a hook 66 adapted to engage around a portion of the frame and retain the hopper in operative position. If for any reason the machine operator desires to swing the hopper to inoperative position the latch is released and the hopper may be lifted vertically against the tension of the spring 63 and swung around on the pin 61 as a pivot.

The lower end of the hopper is disposed above a table 70 and a reciprocating feed bar 71 is mounted to slide on the table and feed in this instance two strips of gum or other material from the hopper to the wrapping mechanism. The feed bar 71 is actuated by a pitman connection 72 to a crank arm 73 carried by the shaft 20.

Referring particularly to Fig. 6 the wrapping mechanism will now be described. As above stated the severed strip of wrapping material is fed downwardly by the rolls 59 and as clearly illustrated this strip moves into the path of the strips or pieces 80 of the gum or other material as the latter are fed by the bar 71 on the table 70. At this point in the operation of the machine and at these respective positions of the strip or material to be wrapped the wrapping mechanism is so positioned as to receive the wrapping strip and material to be placed therein.

Figure 1:
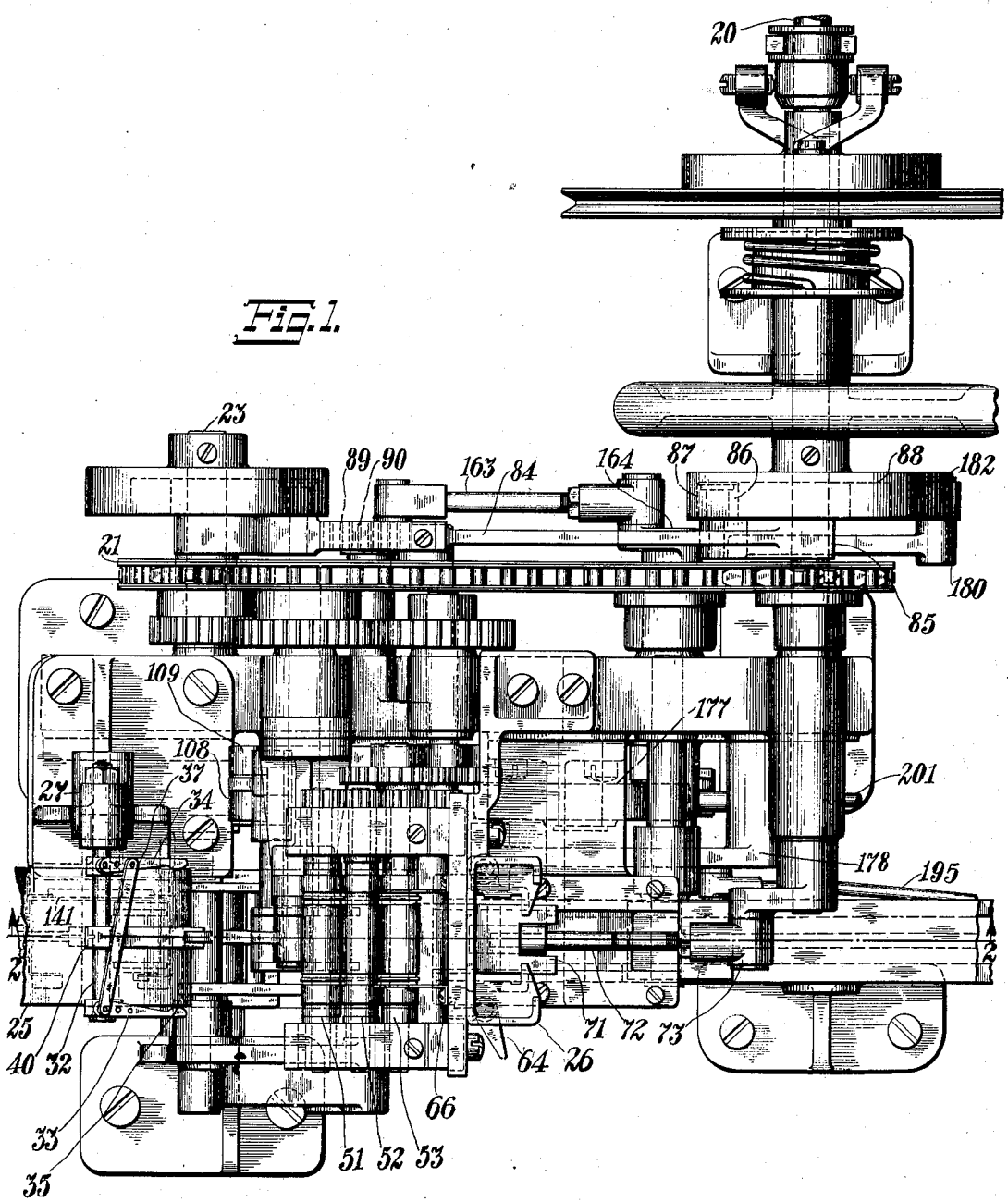

This mechanism comprises a member or roll 81 having laterally extending separated portions 82 forming a longitudinal channel or groove 83. The roll 81 is mounted for oscillating movement and is adapted to oscillate through 90 degrees. The driving connections for this roll are illustrated particularly in Figs. 1 and 2 and comprise a connecting rod or pitman 84 having a forked end 85 receiving the shaft 20 and having mounted at its end a roller 86 positioned in a cam groove 87 formed in the cam 88 secured to the shaft 20. At its opposite end the connecting rod 84 is also forked and has rack teeth 89 on one of the bifurcations engaging teeth 90 of a mutilated spur gear carried by the pintle 91 on which the roller or wrapping member 81 is mounted. This rack and pinion drive rotates the roller 81 through 90 degrees and returns it to its initial position. The member 81 therefore has an oscillating movement properly timed with reference to the operation of the other parts of the apparatus.

As shown particularly in Fig. 6 in dot and dash lines and in Fig. 2 in full lines, the groove 83 of the member 81 in its receiving position is disposed in alignment with the path of movement of the gum strips 80. As the strips 80 are moved by the bar 71 they engage and force the wrapping strip into the groove or channel 83 thereby causing the wrapper to be folded about three sides of the material 80 leaving a flap or overlapping end 92 of the strip extending beyond the edge of the package. This flap 92 is guided by a curved surface 93 of a portion 94 of the machine and as illustrated particularly in Fig. 6 the flap supports the wrapped package as the roller 81 is rotated 90 degrees to a position in which the channel 83 is substantially vertical.

The gum packages are guided downwardly vertically in a frame 95 having a channel therein adapted to receive the packages. The flap 92 is folded in as the package enters the channel in the frame 95. In certain machines similar to the one now being described the wrapped packages are fed by means of an apparatus which, while feeding, moves relatively with respect to the packages and thereby tends to unwrap the package or disarrange the wrapper. The feeding mechanism about to be described was particularly designed to overcome any such relative movement between the feeding members and the packages being fed, and these results are accomplished by effecting a vertical feeding movement and a lateral and upward withdrawing or retracting motion of the feeding means. This feeding mechanism will now be explained.

*Feeding mechanism for wrapped packages.*

The machine illustrated in the drawings is designed to simultaneously operate on three packages. With the parts in the position shown in Fig. 6 the upper package is about to be fed to the tucking and folding mechanism, the intermediate package is disposed in the tucking mechanism and the lower package is about to be fed to the labeling mechanism and is being fed through the folding means.

In order to thus operate on three packages simultaneously, I have provided a series of three pairs of feeding fingers 100, 101 and 102 rigidly fixed with respect to each other and simultaneously operated. These three pairs of fingers are formed on vertically disposed bars 103, and 104 mounted at their upper ends on a shaft 105. The shaft 105 has secured thereto an arm 106 which is connected by a crank 107 to the shaft 22 and is driven thereby. There is also secured to the shaft 105 an arm 108 to which is pivoted a link 109, the opposite end of which is pivoted at 110 on the frame of the machine. The link 109 is so proportioned and pivoted as to modify the movement of the bars 103 and 104 to give the proper and desired feeding and retracting movement to the fingers 100, 101 and 102. This movement is further accomplished by a bar or arm 111 secured to the shaft 105 and also to the bar 103. The member 111 extends downwardly and has mounted on its lower end a roller 112 which in turn is disposed in a track 113, thus confining the movement of the lower end of the member 111 to a reciprocating path.

In effect as shown in Fig. 14 the movement of the fingers is such that during their feeding operation they move substantially vertically downwardly. At the limit of their feeding operation, however, they are raised and move laterally away from the path of the gum packages and are raised through a curved path and returned to their initial position shown in Fig. 6.

Referring again to Fig. 6 the upper finger 100 is about to engage the package of gum in the slot 83 and this finger moves through slots 114 formed in the member 81 and forces the package downwardly into the channel formed in the frame 95. In its downward movement the package first passes to the tucking mechanism which will now be described.

*Tucking mechanism.*

Figure 3:
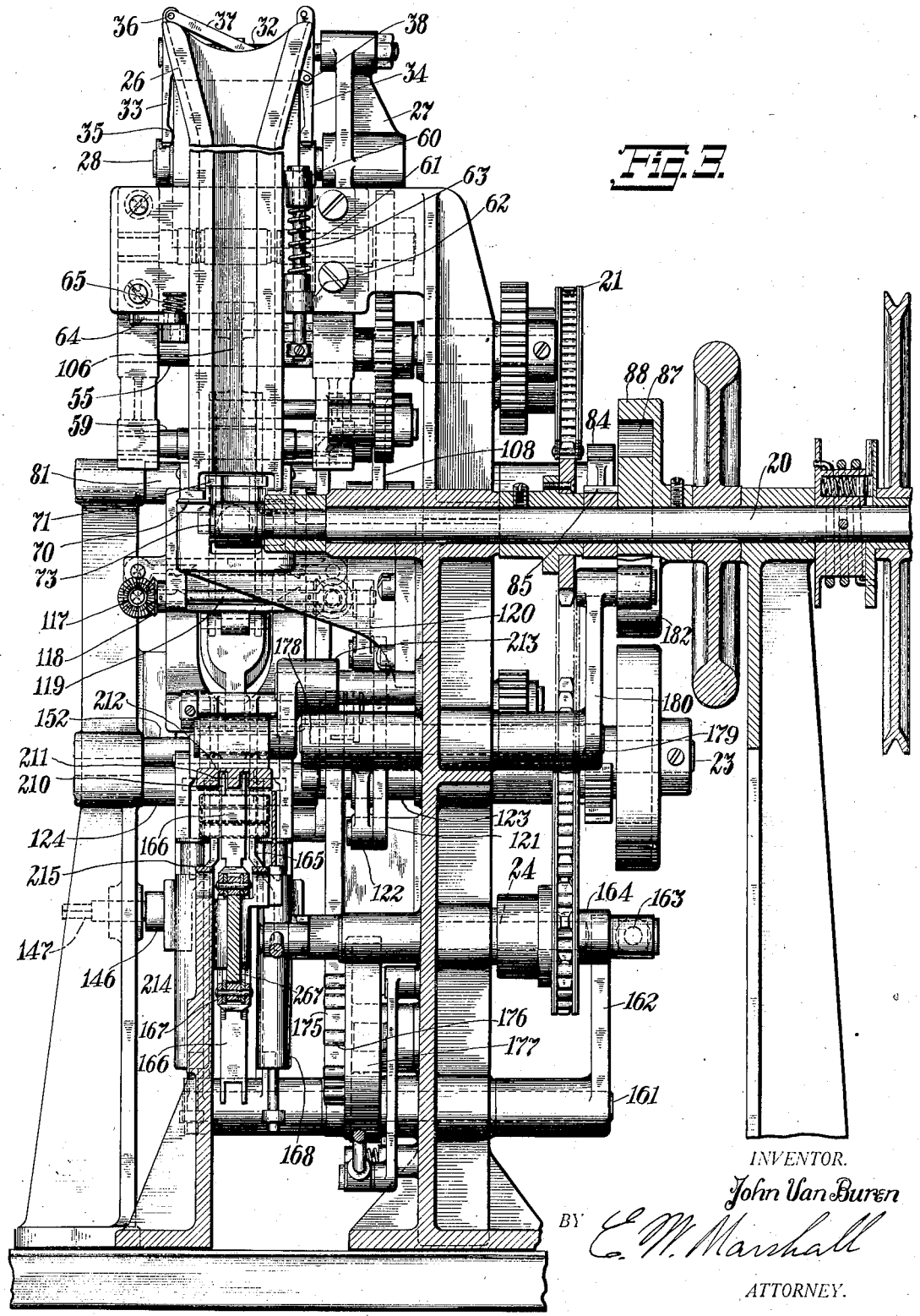

The tucking mechanism is shown particularly in Figs. 3, 8 and 9. This mechanism comprises a frame mounted on the portion 94 in the path of the package and having two sets of tucking fingers 115, each set being disposed at one side of the path of movement of the package and comprising a pair of tucking fingers. When the gum package is fed to the tucking mechanism the tucking fingers are in the dot and dash line position shown in Fig. 8. As the package, however, is properly positioned, as shown in the same figure in full lines, and is temporarily stationary, the tucking fingers are moved by gearing connections hereinafter described to their inner positions shown in full lines in Fig. 8. These fingers engage the overlapping ends of the wrapper and form V-shaped tucks therein as shown in Fig. 10. The fingers are then immediately retracted in position to permit the discharge of the tucked package and the entry of the next succeeding package to the tucking mechanism.

Each finger 115 has formed on its pivoted end gear teeth 116, the teeth of each finger of each pair intermeshing. One of the pintles of one finger of each pair has mounted thereon a bevel gear 117 which meshes with a gear 118 carried by a shaft 119. The shaft 119 has secured thereto an arm 120 connected by a link 121 to an arm 122 secured to a shaft 123 on which shaft is mounted a roll 124 having a channel 125 for receiving the wrapped package of gum. The shaft 123 is driven from the shaft 23 by a connecting rod 126 operated by the shaft 23 and driving the shaft 123 in exactly the same manner as the connecting rod 84 above described. The timing of the operation of the member 124 and of the tucking arms is such that the link connection 121 operates the tucking arm at the proper period in the cycle of operation of the machine.

In order to support the package in proper position for tucking and to arrest it as it moves vertically in the frame 95 I have provided pivoted stops 130, resiliently held by springs 131 in the path of the advancing package.

Wrapper folding mechanism.

From the tucking mechanism the package is moved downwardly by the fingers 101, 102 and 103 and during this downward movement the overlapping ends of the wrapper are folded as shown in Fig. 9 by means of curved guides 132. The package is again brought to rest by means of stops 133 similar to the stops 130 and in position to be engaged by the lower fingers 102 upon the next downward movement thereof. The folding frame is pivoted as shown at 134 to permit a lateral swinging thereof, in case packages are clogged or jammed therein.

Label applying mechanism.

The labels 140 are disposed in a hopper 141 and are fed from the open bottom of the hopper by means of a rotating feeding member 142. A pin 143 is provided for retaining in the hopper the label immediately above the one being fed. Suitable adhesive material such as paste or mucilage is carried by a receptacle 144 pivoted at 145 on the frame of the machine and adjustable vertically by an eccentric or cam 146 carried by a spindle 147. The roller 148 feeds a film of adhesive substance to a plurality of pins 149 carried by a roller 150 disposed vertically upon the roller 148. The roller 150 coacts with a positively driven feed roll 151 to feed the label forwardly and during this feeding movement paste or other adhesive substance is applied to the surface of the label. From the rollers 150 and 151 the label is advanced through rolls 152 into the path of the downwardly moving wrapped package. When the label is so positioned the channel or groove 125 in the member 124 is positioned vertically as shown in full lines in Fig. 6. The downward feeding of the wrapped package by the fingers 120 will cause the package to force the label into the channel and around three sides of the package. The member 124 is thereupon oscillated through 90 degrees to the dot and dash line position shown in Fig. 6. A curved surface 153 will engage the overlapping flap of the label in the same manner as the surface 93 engages the flap 92 of the wrapper. When the member 124 has been swung to the horizontal position the labeled package is pushed out of the channel 125 by a pair of arms 160 carried by a shaft 161 having at its free end an arm 162. The arm 162 is connected by a connecting rod 163 to a crank arm 164 carried by the shaft 24. These parts are so timed that the arms 160 will be actuated to discharge the package from the channel 125 in the member 124 when the package has been rotated to horizontal position.

Package receiving and stacking means.

Figure 7:
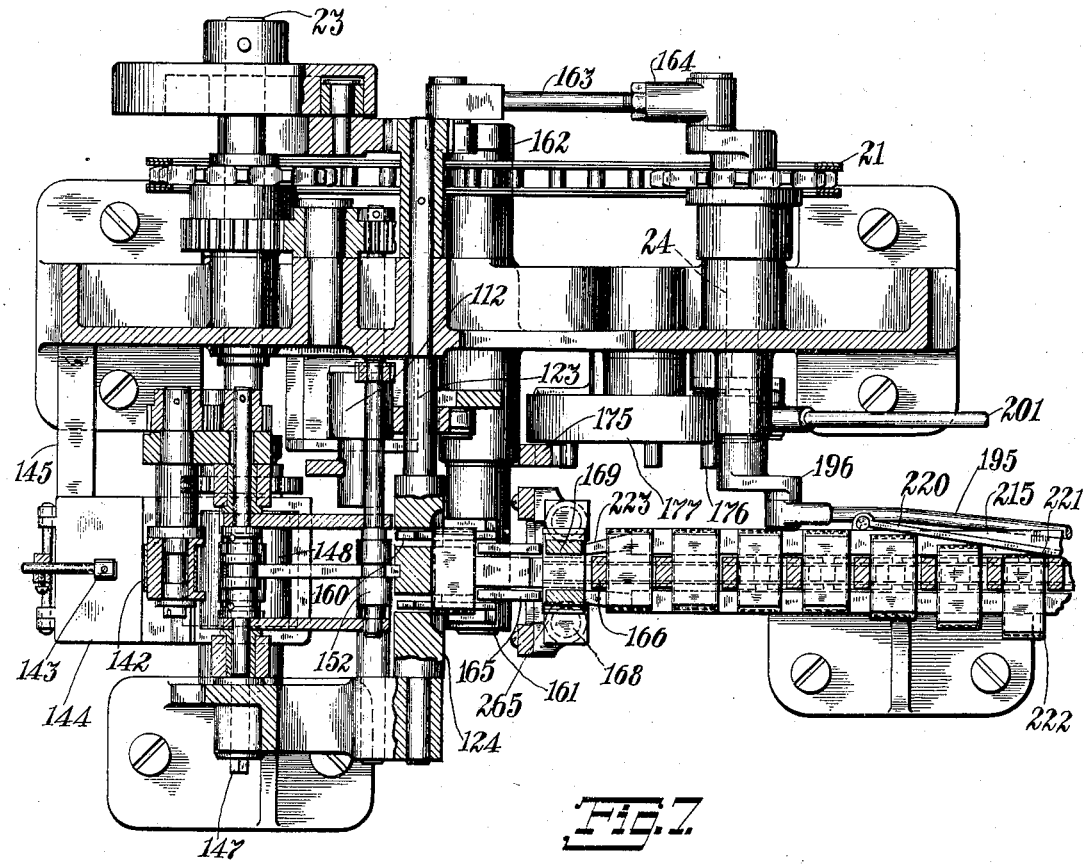
Fig. 7 is a sectional elevation taken substantially on line 7—7 of Fig. 2.

As above pointed out the labeled package is pushed out of the channel or pocket 125 of the member 124 by the arms 160, the package moving in a substantially horizontal direction across the upper surface of supporting and guiding members 165 (see Figs. 2, 6 and 7).

In the form of the invention illustrated the gum packages are received and stacked in pockets formed between fingers 166 carried by links 167 of an endless conveyor or carrier and means hereinafter described is provided for advancing the carrier periodically upon the completion of each stack or lot.

The chain formed by the links 167 is guided around a track surface 267 and at the receiving end this track is curved to position the adjacent arms 166 at an angle, the arm on the curve being indicated as 266. The receiving pocket for the packages is formed by one arm 166, at the front of the pockets and by bars or uprights 265 which form the rear wall of the receiving pocket. Members 265 are shown as formed integral with the members 165. The arms 160 force the package into the pocket thus formed.

Means is provided for retaining the package or packages deposited in the pocket. This means comprises a pair of vertically movable, resiliently actuated plungers 168 disposed as shown in Fig. 7 at the sides of the chain links and in a position to engage the overlapping ends of the gum packages. The chain advancing means is actuated periodically by the movement of members 169 which serve the double function of actuating the advancing means and cooperating with a plunger 168 in retaining the packages in the pocket. The members 169 are mounted on a shaft 170 to which is also secured an arm 171. An arm 172 is loosely mounted on the end of the shaft 170 and is connected with the arm 171 by a spring 173, a stop 174 being provided for limiting the movement of the arm 172 toward the arm 171. The arm 172 has formed on its lower end a hook 175 adapted to engage studs or pins 176 formed on a cam disc 177.

The shaft 170 is carried by an arm 178 mounted on a shaft 179 to which is also secured an arm 180 having a roller 181 mounted on its free end. The roller 181 is adapted to be actuated by a cam 182 mounted on the shaft 20. Thus upon each rotation of the shaft 20 the lever formed by the arms 178 and 180 will be actuated by the cam 182 to lift the members 169. As these members 169 are lifted they are also swung in an anti-clockwise direction by the incoming package of gum and this swinging will also swing the arm 172 thereby moving the hook 175 into a position to engage one of the studs or pins 176. Because of the engagement of the hooks with the pins the lifting of the shaft 170 with the parts carried thereby will advance the cam disc 177 one step or to a position in which the next succeeding pin will be engaged by the hook as the next package of gum is deposited in the pocket between the fingers 166.

The carrier advancing means comprises a ratchet wheel 190 mounted on the shaft 191 and adapted to be advanced through a distance equal to one tooth upon the completion of each stack of gum. The ratchet wheel is actuated by a pawl 192 carried by an arm 193 and normally pressed in a direction toward the ratchet wheel by a spring 194. The arm 193 is connected by a pitman or connecting rod 195 to a crank 196 carried by the shaft 24 and therefore upon each rotation of the shaft the pawl is oscillated a sufficient distance to advance the wheel through an angle equal to one tooth. It will be understood, however, that the chain or carrier should not be advanced upon each rotation of the shaft 24 but only when a stack is completed and in order to so regulate the movement of the carrier a disc 197 is loosely mounted on the shaft 191 and is provided with a laterally extending annular flange 198. The flange 198 does not extend entirely around the disc but is broken at 199 and 200 and the pawl 192 is adapted to extend through this broken portion and engage the ratchet teeth at the desired period in the cycle. The disc 197 is angularly controlled by a link 201 which is connected at 202 to the disc and at 203 to a lever 204. The lever 204 is pivoted on a fixed pivot 205 and carries intermediate its ends a roller 206 which in turn is positioned in a cam groove 207 formed on the cam disc 177. As will be seen from Figs. 2 and 11 the cam groove has formed therein two offset or eccentric portions 208 by means of which the roller 206 is moved laterally to actuate the disc 197 in a direction to release the pawl 192 from the holding effect of the portion 200 of the flange 198 on the disc 197.

From the showings in Figs. 2 and 11 it will be seen that in the present embodiment of the invention five studs or pins 176 are formed on or secured to the cam disc 177. Each of these pins corresponds to a package of gum or other material. By providing two offset portions 208 for the disc it will be seen that provision has been made for stacking the labeled packages in lots of five each. It will be understood, however, that by merely changing the number of pins or the location or number of the offset portions of the cam grooves 207, the size of the stack or number of packages therein can easily be changed to suit other requirements.

Figure 5:
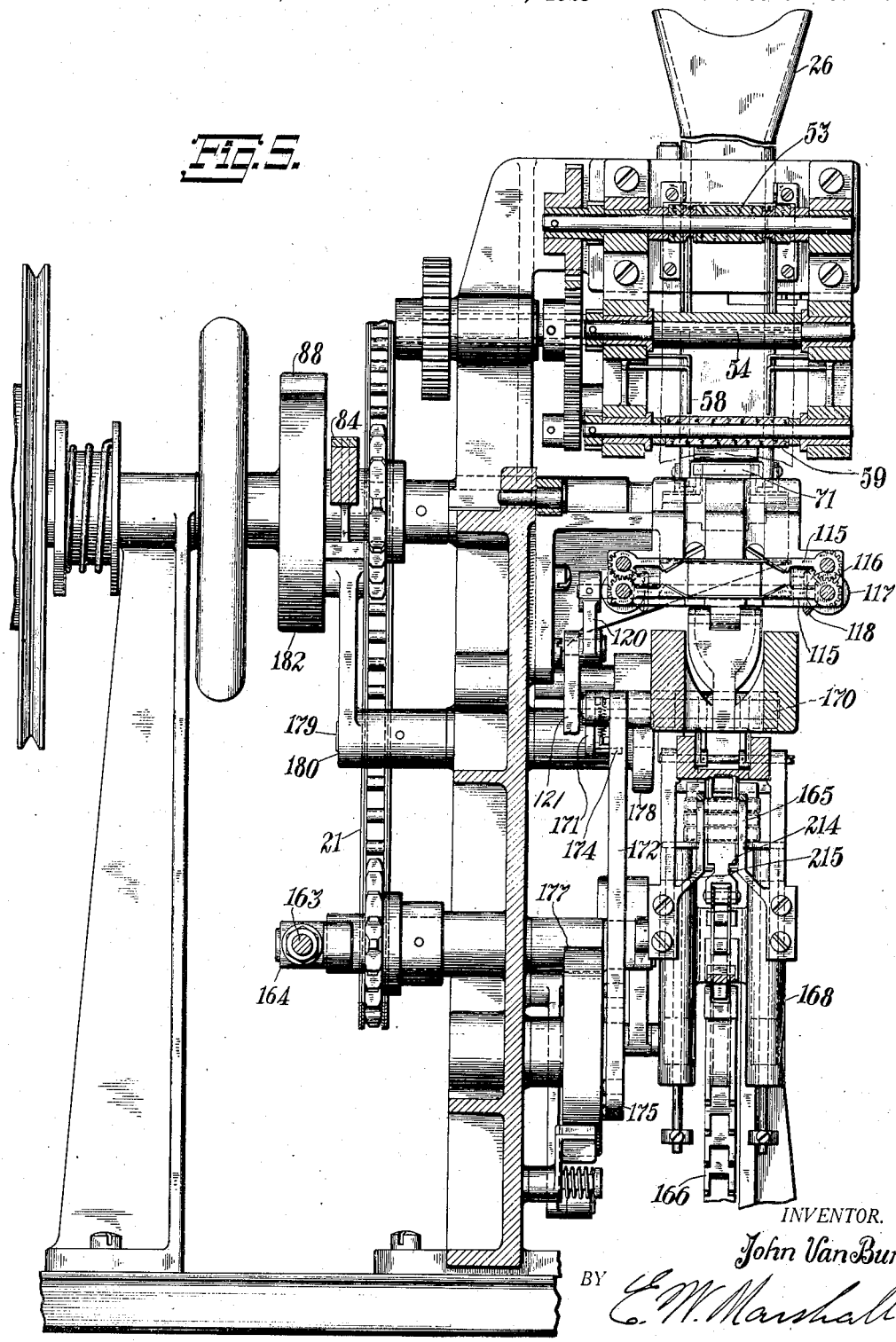

As shown particularly in Fig. 3 the fingers 166 are bifurcated at 210 at their upper ends and the bifurcated portions enter channels 211 formed in a cover 212 supported by brackets 213 upon the endless carrier. The fingers 166 are also recessed as shown at 214 (see Figs. 3 and 5) to receive supporting platform members 215 upon which the overlapping edges of the gum packages are supported.

In order to insure the proper guiding of the packages to the pockets between the fingers 166, a guiding strip 216 is carried by the platform and extends from the platform to a position adjacent the delivery position of the channel 122 formed in the member 124. (See Figs. 7 and 11.)

The gum packages may be delivered by the endless carrier to a hopper or receptacle placed at the discharge end thereof or may be manually removed from the pockets formed by the fingers 166. In order to enable the machine operator to more readily grasp the packages, I have provided means for moving the packages laterally in the pockets formed by the fingers 166 to a position in which they overlap the edge of one of the platforms 215. This means comprises a plate 220 carried by the opposite platform 215 and disposed angularly with respect to the path of movement of the carrier and the gum. The outer end 221 of this plate is adapted to engage the gum packages and as they advance with the carrier they will be moved laterally in the pocket to the position shown at 222 in Fig. 7.

In Figs. 2 and 6 I have also shown means corresponding to the guiding members 126 for guiding the gum packages to the platforms 215. This means comprises a pair of preferably resilient guiding strips 223 (see Fig. 6) secured to the ends of the platforms.

Operation.

The operation of the wrapping and labeling machine will now be outlined. The web 50 of wrapping material is drawn from the supply roll 25 through rollers 51, 52 and 53 and from the roller 53 the web passes downwardly to the cutting mechanism where it is cut by the knife 55. From the cutting means the web is accelerated or advanced rapidly by the feeding rolls 59 to a position in the path of the strips of gum or other material which are fed by the reciprocatory slide bar 71.

The severed strip of material 80 is forced into the pocket or channel 83 formed in the member 81 and the member 81 is thereafter rotated through 90 degrees, the gum package being supported by the overlapping portion 92 of the wrapper.

The package is then engaged by the fingers 100 and is fed downwardly in channels formed in the frame 95 to the tucking mechanism. The overlapping ends of the wrapper are then tucked by the fingers 115 as the package is supported in the stationary position by the fingers 130. The tucked package is then fed downwardly by the fingers 101 through the folding members and the overlapping ends are folded. The wrapped package is then engaged by the fingers 102 and is fed downwardly into engagement with a label 140 which has previously been fed beneath the channels in the frame 95. The fingers 102 force the wrapped package and the label into pocket or channel 125 formed in the member 124. The member 124 is thereafter rotated through 90 degrees to the dot and dash line position shown in Fig. 6 and the completed package is discharged from the pocket 125 by the arms 160.

As the completed package is being delivered to the pocket between two of the fingers 166 of the carrier chain the package will engage members 169 and will rotate these members thereby moving the hook 175 to a position beneath one of the pins 176. The lifting of the shaft 170 and therefore of the arm 174 and hook 175 carried thereby will rotate the cam disc 177, through an angle equal to one tenth of a revolution. Assuming that the operation now being described started with a stack just completed and that the first package delivered during the operation is deposited in an empty pocket, after the fifth package has been deposited the cam offset 208 will cause the lever 204 to rotate the disc 197 through an angle sufficient to release the pawl 192. The actuation of the pawl thereafter will rotate the ratchet wheel 190 and this rotation will cause the endless carrier to advance one step.

From the foregoing specification it will be seen that simple, practical and effective means has been provided for wrapping and labeling packages. By reason of the particular mechanical movement of the package advancing fingers, the fingers will effectively perform their feeding function but will not disarrange the wrapper or otherwise interfere therewith. It will also be noted that effective means has been provided for receiving, stacking and delivering the wrapped and labeled packages.

Although one specific embodiment of the invention has been illustrated and described, it will be understood that the invention is capable of modification and that changes in the construction and in the arrangement of the various cooperating parts may be made without departing from the spirit or scope of the invention as expressed in the following claims.

What I claim is:—

1. In a machine of the class described, means for feeding a wrapper, means for feeding an object to be wrapped in a direction at an angle to the wrapper and across the path thereof and oscillatory means disposed in the path of movement of the object for receiving the object and wrapper prior to the folding of the wrapper and for partially folding the wrapper around the object.

2. In a machine of the class described, means for feeding a wrapper, means for feeding an object to be wrapped in a direction at an angle to the wrapper and across the path thereof, oscillatory means disposed in the path of movement of the object for receiving the object and wrapper prior to the folding of the wrapper around the object and partially folding the wrapper around the object, and means for oscillating said oscillatory means through an angle of approximately 90° to discharging position after the wrapper and object have been placed therein.

3. In a machine of the class described, a member having a channel to receive a wrapper and object to be wrapped, means for oscillating said member through an angle of 90 degrees, and means engageable with the package while the package is in said channel for discharging the wrapper and package from said member.

4. In a machine of the class described, a member having a channel to receive a wrapper and object to be wrapped, means for oscillating said member through a predetermined angle and means movable substantially in a straight line when in engagement with the package for discharging the wrapper and package from said member.

5. In a machine of the class described, a member having a channel to receive a wrapper and object to be wrapped, means for oscillating said member through a predetermined angle and means for discharging the wrapper and package from said member, said last named means being engageable with the package but held against relative lateral movement with respect to the package.

6. In a machine of the class described, a member having a channel to receive a wrapper and object to be wrapped, means for oscillating said member through a 90° angle and means movable through slots in the member for discharging the wrapper and package from said member.

7. In a machine of the class described, an oscillatable member having a pocket for receiving an object and a wrapper, means for moving the wrapper and object into the pocket, a frame for receiving and guiding the wrapped object, means for oscillating said member through an angle of approximately 90° to a position in which the pocket is alined with the frame, and means engageable with the package while the package is in said channel for discharging the package from the pocket into the frame.

8. In a machine of the class described, an oscillatable member having a pocket for receiving an object and a wrapper, means for moving the wrapper and object into the pocket, a frame for receiving and guiding the wrapped object, means for oscillating said member to a position in which the pocket is alined with the frame, and means engageable with the package and movable in a straight line while in engagement therewith for discharging the package from the pocket into the frame.

9. In a machine of the class described, a member having a channel and oscillatable through an angle of approximately 90° from a position in which the channel is horizontally disposed to a position in which the channel is vertically disposed, means for moving a wrapper and object to be wrapped into the channel in its horizontal position with a portion of the wrapper extending beyond the channel, positively actuated means engageable with the wrapped object for discharging the wrapped object from the channel in its vertical position, and means engageable with the extending portion of the wrapper for retaining the wrapper and object in the channel when the latter is disposed in vertical position.

10. In a machine of the class described, a package receiving and guiding frame, tucking mechanism and folding mechanism carried thereby, continuously actuated step by step feeding means for feeding the package to the tucking mechanism, from the tucking mechanism to the folding mechanism and for discharging the folded package from the folding mechanism, and means for operating the tucking mechanism in the interval between the first and second feeding steps.

11. In a machine of the class described, a package receiving and guiding frame, tucking mechanism and folding mechanism carried thereby, step by step feeding means including fingers for feeding the package to the tucking mechanism, from the tucking mechanism to the folding mechanism and for discharging the folded package from the folding mechanism, and means for imparting a straight line feeding movement and a curved retracting movement to said fingers.

12. In a machine of the class described, a frame for receiving and guiding packages, tucking mechanism and folding mechanism carried thereby, successively acting feeding means for feeding packages vertically to and from said mechanisms and means for supporting the packages in the intervals between the feeding of said packages.

13. In a machine of the character described, a vertically disposed frame for receiving and guiding packages, tucking mechanism and folding mechanism carried thereby, successively acting feeding means for feeding packages to and from said mechanisms and means for supporting the packages in the intervals between the feeding of said packages.

14. In a machine of the class described, a frame for receiving and guiding packages, tucking mechanism and folding mechanism carried thereby, successively acting feeding means for feeding packages vertically to and from said mechanisms and resiliently actuated stop means for supporting the packages in the intervals between the feeding of said packages.

15. In a machine of the class described, a vertically disposed frame for receiving and guiding packages, tucking mechanism and folding mechanism carried thereby, successively acting feeding means for feeding packages to and from said mechanisms and resiliently actuated stop means for supporting the packages in the intervals between the feeding of said packages.

16. In a machine of the class described, means for feeding a wrapped package, means for feeding a label in the path of said package, a channeled member, means for positioning said member with its channel disposed in the path of movement of the package and label, means for oscillating said member through a predetermined angle and positively actuated means engageable with the labeled package for discharging said package from said channel.

17. In a machine of the class described, an oscillatory member having a slot, means for feeding a label and wrapped package into said slot, means for periodically oscillating said member to discharging position and back to receiving position, and means for engaging and discharging the labeled package from the slot.

18. In a machine of the class described, a pair of oscillating arms having pockets therein, means for holding said arms in a position to receive a package into the pocket of the first of said arms from one direction and to hold the second of said arms in position to receive a package in a direction at right angles to said first movement, means for oscillating the first of said arms to bring its pocket in a position to discharge a package into the pocket of the second arm and for oscillating the second arm to bring its pocket into position to discharge the package from its pocket in a direction parallel to that in which the package had been delivered to the pocket of the first arm, and for moving said arms back.

In witness whereof, I have hereunto set my hand.

JOHN VAN BUREN.